US008421834B2

(12) United States Patent
Miyagawa

(10) Patent No.: US 8,421,834 B2
(45) Date of Patent: Apr. 16, 2013

(54) EXPOSURE DEVICE AND ENGRAVING APPARATUS

(75) Inventor: Ichirou Miyagawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 393 days.

(21) Appl. No.: 12/659,904

(22) Filed: Mar. 25, 2010

(65) Prior Publication Data

US 2010/0282720 A1 Nov. 11, 2010

(30) Foreign Application Priority Data

Mar. 31, 2009 (JP) ................................ 2009-084642

(51) Int. Cl.
*B41J 2/447* (2006.01)
*B41J 2/455* (2006.01)
*B23K 26/36* (2006.01)

(52) U.S. Cl.
USPC ...................... 347/233; 347/241; 219/121.76

(58) Field of Classification Search .................. 430/300, 430/302, 307; 347/224, 233, 241; 372/6, 372/9, 24; 219/121.68, 121.69, 121.73, 121.76
See application file for complete search history.

(56) References Cited

U.S. PATENT DOCUMENTS

| | | | | |
|---|---|---|---|---|
| 3,636,251 | A * | 1/1972 | Daly et al. | 358/3.31 |
| 6,304,541 | B1 * | 10/2001 | Chang et al. | 369/112.06 |
| 6,888,853 | B1 | 5/2005 | Jurgensen | |
| 2003/0020893 | A1 * | 1/2003 | Kawashima | 355/67 |
| 2006/0065147 | A1 | 3/2006 | Ogawa | |
| 2008/0143987 | A1 | 6/2008 | Uemura | |

FOREIGN PATENT DOCUMENTS

| | | | |
|---|---|---|---|
| JP | 09265722 | A * | 10/1997 |
| JP | 2004-233660 | | 8/2004 |
| JP | 2008-153401 | A | 7/2008 |
| WO | WO 2007/149208 | | 12/2007 |

* cited by examiner

*Primary Examiner* — Samuel M Heinrich
(74) *Attorney, Agent, or Firm* — Jean C. Edwards, Esq.; Edwards Neils PLLC

(57) ABSTRACT

An exposure device engraves an image on the surface of a recording medium by scanning and exposing the recording medium with a light beam emitted from an exposure head. The exposure head comprises a light source for emitting a light beam, an exposure lens for causing the light beam to form an image on or close to the surface of the recording medium, a direction changer disposed upstream or downstream of the exposure lens in the direction in which the light beam travels, and/or inside of the exposure lens on the optical path of a light beam having a numerical aperture higher than a given numerical aperture to change the direction of the light beam having a numerical aperture higher than a given numerical aperture in such a manner as not to affect the process of engraving an image on a surface of the recording medium.

15 Claims, 10 Drawing Sheets

EXPOSURE DEVICE AND ENGRAVING APPARATUS

CROSS-REFERENCE TO RELATED APPLICATIONS

The present application claims priority from Japanese Patent Application No. 2009-084642, filed Mar. 31, 2009, the contents of which are herein incorporated by reference in their entirety.

BACKGROUND OF THE INVENTION

The present invention relates to an exposure device for scanning and exposing a recording medium with a light beam to engrave a desired image on a surface of a recording medium and an engraving apparatus for engraving an image in a recording medium with the exposure device.

There is known an engraving apparatus whereby a drum having a recording plate (recording medium) provided over its peripheral surface is turned in a main scan direction while an exposure device is used to scan the recording plate with a laser beam corresponding to an image to be engraved (recorded) on the recording plate in a subscan direction that is orthogonal to the main scan direction to achieve 2-dimensional scan and exposure of the recording plate with the laser beam, thereby engraving (recording) a 2-dimensional image for printing on the recording plate.

Now, where, for example, a flexographic printing plate is engraved as the recording plate mentioned above, an irradiation power of no less than several hundreds of watt will be required at the surface of the plate. To achieve this, there is proposed a multi-beam exposure system using a light source configured using low-cost high-output fiber coupled laser diodes (referred to as FC-LDs below) connected to optical fibers instead of expensive $CO_2$ lasers or fiber lasers and optical fibers.

Where, for example, an FC-LD light source capable of irradiation power of the order of 10 watt is used, optical fibers each having a core diameter of about 105 μm will be required. However, when a laser beam having a core diameter of about 105 μm emitted from a tip of each optical fiber is caused to converge (form an image) on the plate, the converging angle (image forming numerical aperture) increases, causing such problems as increased costs for manufacturing an exposure lens (due to aberration correction) and reduction in focal depth for an exact engraving.

To avoid this, normally an aperture member is placed inside an exposure system to intercept unnecessary light. For example, an aperture member 35 is provided between a collimating lens 32 and an imaging lens 34 as illustrated in FIG. 12 or a frame member 36 of the imaging lens 34 is used instead of the aperture member as illustrated in FIG. 13 in order to block a laser beam having a numerical aperture higher than a given numerical aperture. However, this causes a problem that a large amount of heat is generated in the aperture member 35 or the frame member 36 of the imaging lens 34 owing to interception of light.

There has conventionally been made various technological proposals related to exposure devices.

U.S. Pat. No. 6,888,853 B, for example, describes a laser radiation source comprising diode-pumped fiber lasers configured that can be directly modulated as a laser beam generating source wherein output terminals of the fiber lasers are arranged parallel to each other in tracks and wherein the laser radiation beams emitted from the output terminals of the fiber lasers are collected to travel and strike a processing surface parallel to each other in their respective tracks.

JP 2004-233660 A describes an exposure device wherein light emission means and a converging lens are predisposed so that light emission units are arranged in a direction orthogonal or substantially orthogonal to an eccentric direction of the converging lens and wherein the light emission means and the converging lens are turned integrally to switch between the tilt angles of the direction in which the light emission units are arranged with respect to a preset scan direction in order to switch between resolutions at an exposure surface of lights emitted from the light emission units.

US 2006/0065147 A describes a printing plate producing apparatus by scanning a recording material by a laser beam and thus engraving the surface thereof, wherein a laser beam having a first beam diameter is used to irradiate the recording material at a first pixel pitch and thereby achieve engraving to a first depth, and subsequently a laser beam having a second beam diameter is used to irradiate the recording material at a second pixel pitch and thereby achieve engraving to a second depth.

SUMMARY OF THE INVENTION

An object of the present invention is to provide an exposure device and an engraving apparatus capable of inhibiting heat generation caused by a light beam having a numerical aperture higher than a given numerical aperture.

To achieve the above object, the present invention provides an exposure device for engraving an image on a surface of a recording medium by scanning and exposing the recording-medium with a light beam emitted from an exposure head, wherein the exposure head comprises a light source that emits a first light beam, an exposure lens for causing the first light beam emitted from the light source to form an image on or close to the surface of the recording medium, and a direction changer disposed in at least one location of upstream of the exposure lens in a travel direction of the first light beam, downstream of the exposure lens in the travel direction of the first light beam and inside of the exposure lens on an optical path of a second light beam forming a part of the first light beam and having a numerical aperture higher than a given numerical aperture to change a travel direction of the second light beam in such a manner as to prevent the second light beam from affecting a process of engraving the image on the surface of the recording medium.

The present invention also provides an engraving apparatus comprising the above exposure device and a drum having mounted thereon a recording medium on which an image is engraved by a light beam, the drum being turned so that the recording medium is fed in a main scan direction, wherein the drum is turned in the main scan direction while the first light beam corresponding to image data of an image to be engraved on the recording medium is emitted from the exposure head as the exposure head is scanned at a given pitch in a subscan direction orthogonal to the main scan direction to engrave the image corresponding to the image data on the recording medium.

The present invention uses the direction changer to permit significant reduction of heat generation caused by the light beam having the numerical aperture higher than the given numerical aperture by changing the angle of the light beam having the numerical aperture higher than the given numerical aperture.

DETAILED DESCRIPTION OF THE INVENTION

Now, an exposure device and an engraving apparatus of the invention will be described in detail below referring to preferred embodiments illustrated in the accompanying drawings. A configuration of an engraving apparatus 11 provided with an exposure device (laser recording apparatus) 10 of the invention will be described by referring to FIG. 1 first.

Figure 1:
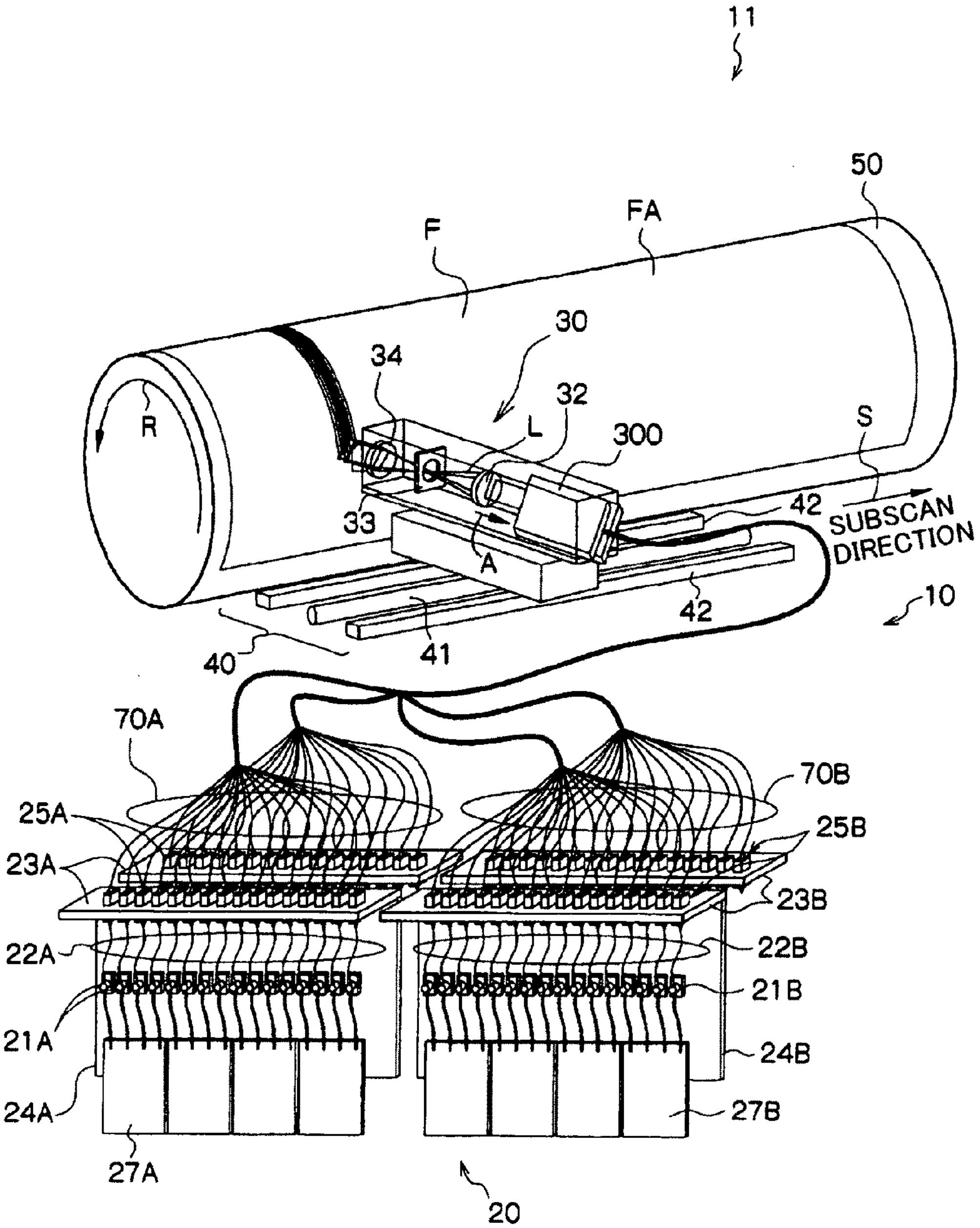
FIG. 1 is a perspective view illustrating a schematic configuration of the engraving apparatus provided with the exposure device according to an embodiment of the invention.

In an embodiment of the engraving apparatus 11 provided with the exposure device 10 illustrated in FIG. 1, a drum 50 having a recording plate F (recording medium) mounted on the peripheral surface thereof is turned in a main scan direction while laser beams (light beams) corresponding to image data of an image to be engraved (recorded) on the recording plate F are emitted simultaneously as an exposure head 30 is scanned (moved) at a given pitch in a subscan direction that is orthogonal to the main scan direction to achieve a high-speed engraving (recording) of a 2-dimensional image on the recording plate F.

As illustrated in FIG. 1, the engraving apparatus 11 comprises the exposure device 10 and the drum 50, which has the recording plate F mounted thereon for engraving (recording) an image thereon with laser beams and is turned in a direction indicated by an arrow R in FIG. 1 to move the recording plate F in the main scan direction. The exposure device 10 comprises a light source unit 20 for producing laser beams, the exposure head 30 for exposing the recording plate F to laser beams produced by the light source unit 20, and an exposure head moving unit 40 for moving the exposure head 30 in the subscan direction.

The main scan direction is a rotation direction R of the drum 50; the subscan direction is, as will be described later in detail, a direction in which the exposure head 30 moves along an axis direction of the drum 50 (in the longitudinal direction thereof).

The light source units 20 comprise semiconductor lasers 21A, 21B, each numbering 32 pieces (64 pieces in total), constituted by broad area semiconductor lasers (FC-LD light sources), which are each connected to one end of their respective optical fibers 22A, 22B; light source boards 24A, 24B bearing thereon the semiconductor lasers 21A, 21B; adapter boards 23A, 23B each attached vertically to one end of their respective light source boards 24A, 24B and provided with adapters for SC-type optical connectors 25A, 25B (provided in the same number as the semiconductor lasers 21A, 21B); LD driver boards 27A, 27B attached horizontally to the other ends of the light source boards 24A, 24B and provided with an LD driver circuit 26 (see FIG. 6) for driving the semiconductor lasers 21A, 21B according to image data of an image to be engraved (recorded) on the recording plate F.

Figure 2:
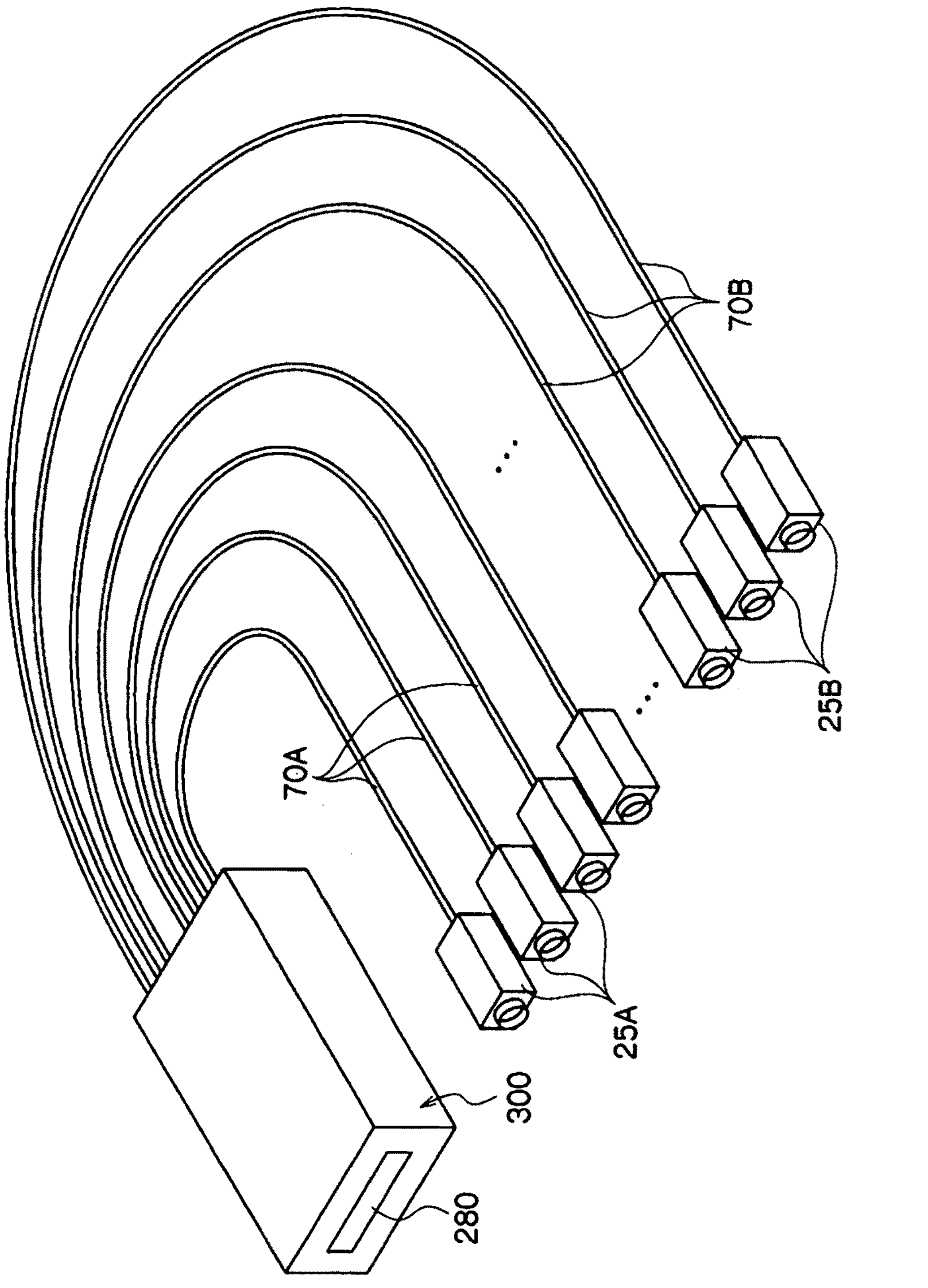
FIG. 2 is a perspective view illustrating a fiber array unit and optical fibers of the exposure device.

The other ends of the optical fibers 22A, 22B are provided respectively with the SC type optical connectors 25A, 25B (see FIG. 2), the SC type optical connectors 25A, 25B are connected to the adapter boards 23A, 23B. Thus, the laser beams emitted from the semiconductor lasers 21A, 21B are transmitted to the SC type optical connectors 25A, 25B connected to the adapter boards 23A, 23B through the optical fibers 22A, 22B.

The output terminals of the drive signals generated by the LD driver circuit 26A provided on the LD driver boards 27A, 27B for driving the semiconductor lasers 21A, 21B are separately connected to the semiconductor lasers 21A, 21B, respectively, to control the drive of the semiconductor lasers 21A, 21B individually through the LD driver circuit 26.

The exposure head 30 comprises a fiber array unit 300 (see FIG. 2) for collectively emitting the laser beams emitted from the semiconductor lasers 21A, 21B. The fiber array unit 300 receives laser beams transmitted from the semiconductor lasers 21A, 21B through optical fibers 70A, 70B connected to the SC type optical connectors 25A, 25B that are in turn connected to the adapter boards 23A, 23B, respectively.

Figure 3:
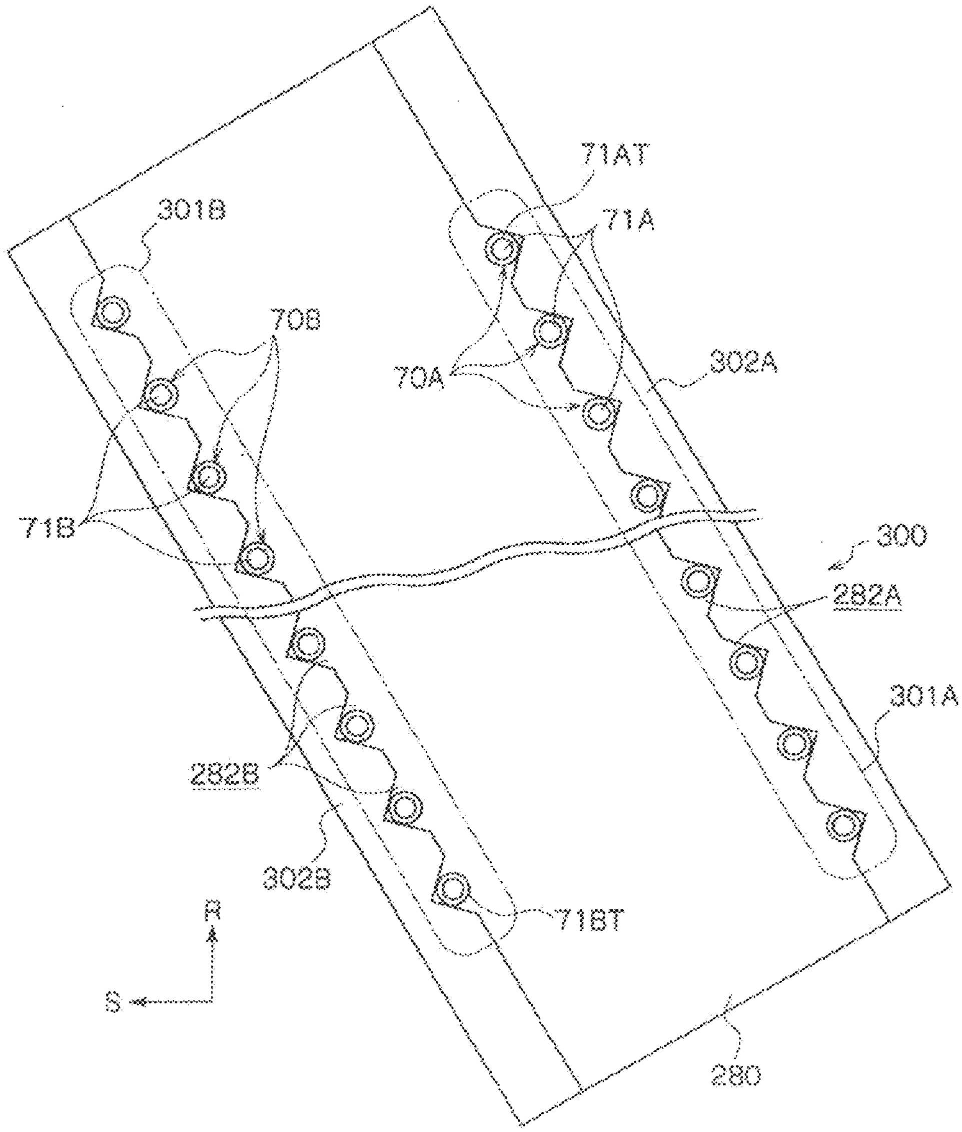
FIG. 3 is a schematic view illustrating an exposure unit of the fiber array unit of the exposure device.

FIG. 3 illustrates an exposure unit 280 of the fiber array unit 300 (see FIG. 2) as seen from a direction indicated by an arrow A in FIG. 1. As illustrated in FIG. 3, the exposure unit 280 of the fiber array unit 300 comprises two bases 302A, 302B. The bases 302A, 302B respectively have formed adjacent to each other on one side thereof V-shaped grooves 282A, 282B, at given intervals in the same number as the semiconductor lasers 21A, 21B, i.e., 32 each. The bases 302A, 302B are disposed so that the V-shaped grooves 282A, 282B face each other.

The V-shaped grooves 282A of the base 302A have other ends 71A of the optical fibers 70A embedded therein respectively. Likewise, the V-shaped grooves 282B of the base 302B have other ends 71B of the optical fibers 70B embedded therein respectively. Therefore, the exposure unit 280 of the fiber array unit 300 simultaneously emits a plurality of laser beams (2×32=64 beams according to this embodiment) that were emitted from the semiconductor lasers 21A, 21B.

Thus, the fiber array unit 300 according to this embodiment is configured by two groups 301A, 301B of the optical fiber ends composed of the optical fiber ends 71A, 71B (2×32=64 in total according to this embodiment) disposed in a straight line in a given direction so that the two groups are parallel to each other in a direction orthogonal to that given direction.

Figure 5:
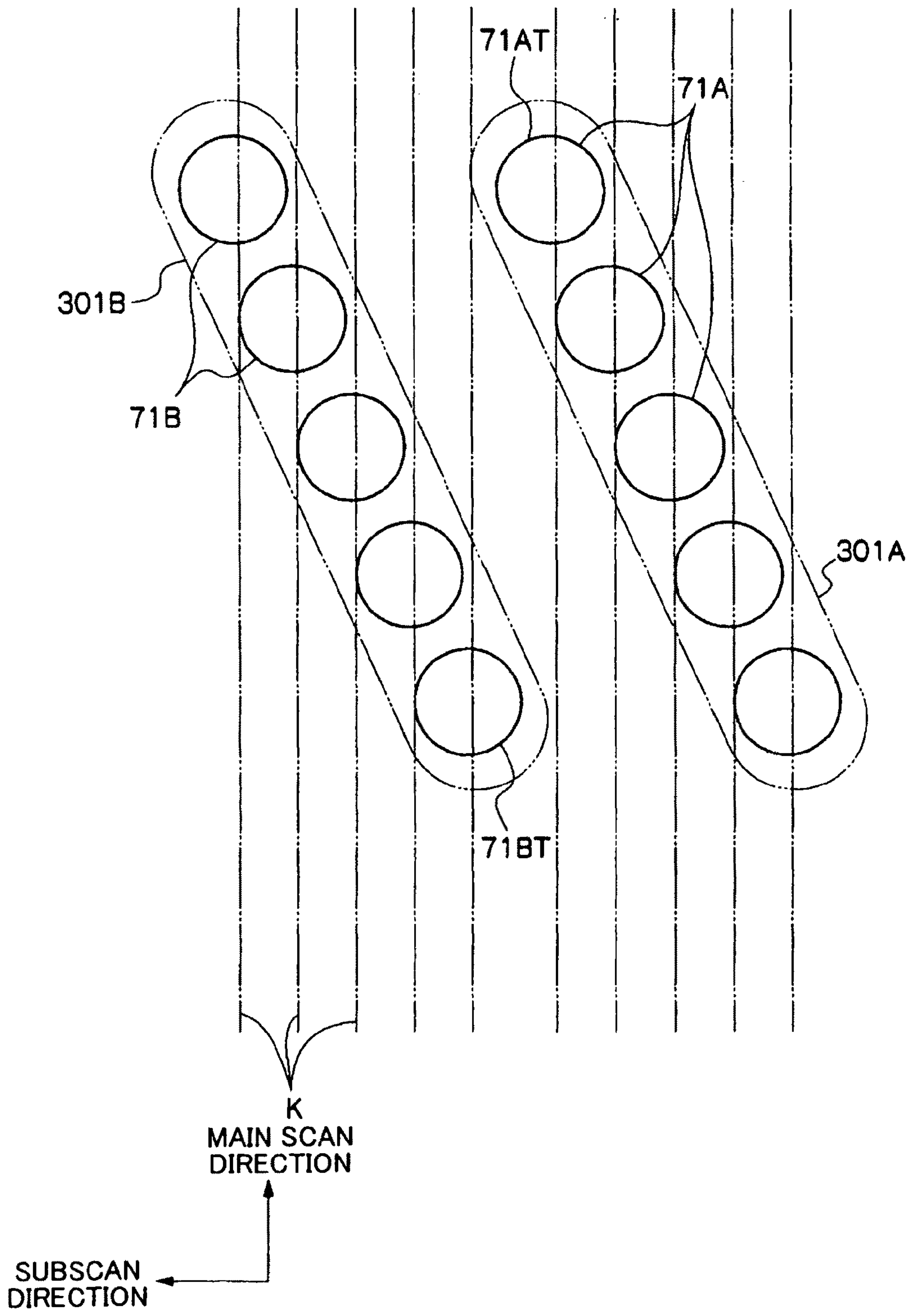
FIG. 5 is a view for explaining scan lines and positions where ends of the optical fibers are disposed.

According to this embodiment, the thus configured fiber array unit 300 (exposure head 30) of the exposure device 10 is disposed so that said given direction is inclined with respect to the subscan direction as illustrated in FIGS. 1 and 3. When seen in the main scan direction, the group 301A of optical fiber ends and the group 301B of optical fiber ends are so disposed not to overlap in the subscan direction, as illustrated in FIGS. 3 and 5

As illustrated in FIG. 1, the exposure head 30 comprises the collimating lens 32, the direction changer 33, and the imaging lens 34 disposed in this order, the collimating lens being closest to the fiber array unit 300. The collimating lens 32 and the imaging lens 34 form a part of the exposure lens (imaging means) of the invention.

The exposure head moving unit 40 comprises a ball screw 41 and two rails 42 lying in the subscan direction. Upon actuating a subscan motor 43 (see also FIG. 6) for turning the ball screw 41, the exposure head 30 disposed on the ball screw 41 can be guided along the rails 42 and thus moved in the subscan direction; achieving the subscan. The drum 50 can be turned in the direction indicated by an arrow R in FIG. 1 upon actuating a main scan motor 51, achieving the main scan.

This embodiment uses multi-mode optical fibers, which have a relatively large core diameter, as the optical fibers 22A, 22B to ensure a high output for the laser beams. Specifically, the optical fibers 22A, 22B have a core diameter of 105 μm in this embodiment. The semiconductor lasers 21A, 21B used in this embodiment produce a maximum output of 10.0 watt (6398-L4).

Figure 4:
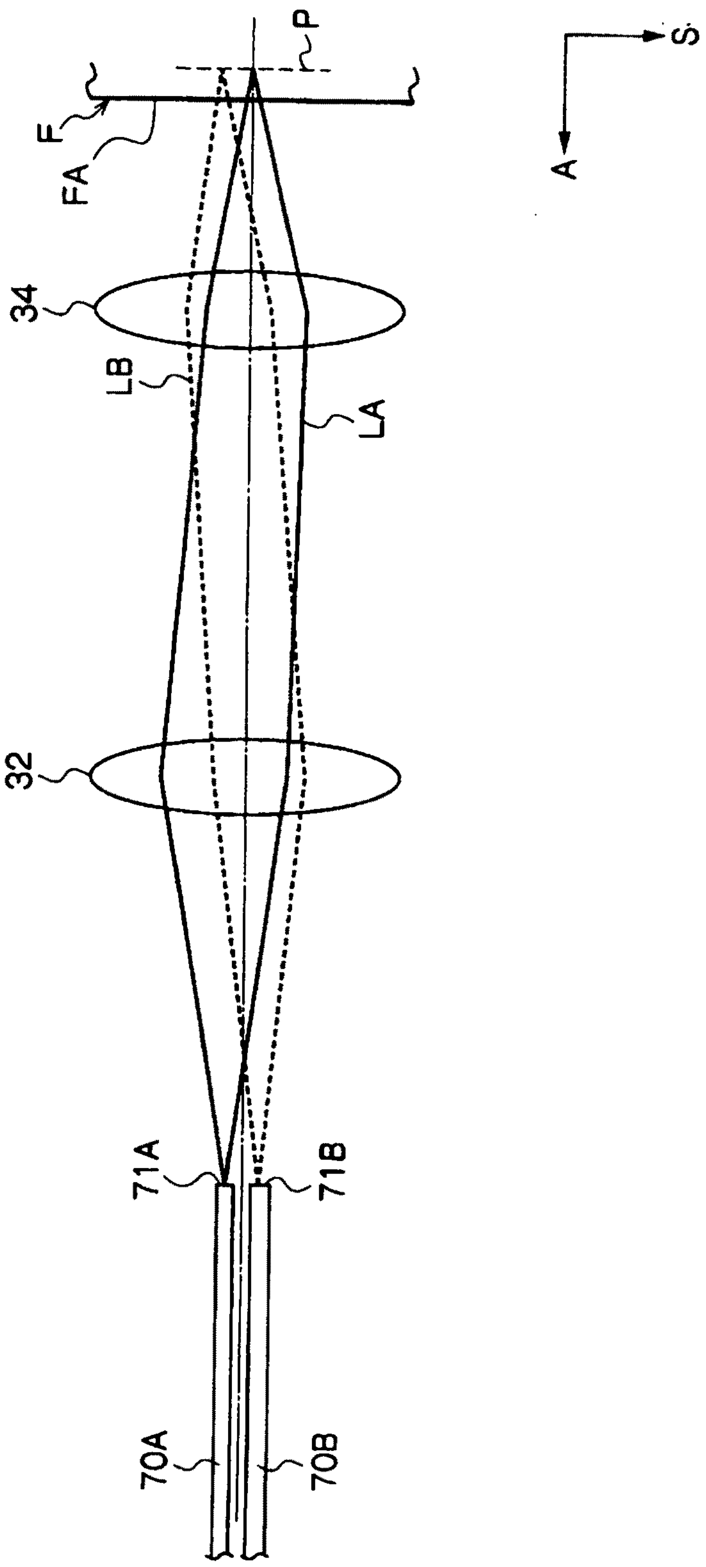
FIG. 4 is a schematic view illustrating a major part of an exposure head and emitted laser beams.

As illustrated in FIG. 4, the exposure lens configured by the collimating lens 32 and the imaging lens 34 causes the laser beams to form an image on an exposure surface (the surface) FA of the recording plate F or close to the exposure surface FA (FIG. 4 does not show the direction changer 33). The imaging position (converging position) P is preferably located close to the surface of the recording plate considering the deterioration of, for example, reproducibility of fine lines caused by blurred beam spots due to defocusing. The imaging magnification is 0.33 in this embodiment. Accordingly, the optical fibers 70A, 70B having a core diameter of 105 μm (R1) at the optical fiber ends 71A, 71B (groups 301A, 301B of optical fiber ends) emit laser beams LA, LB having a spot diameter of 35 μm.

As schematically illustrated in FIG. 5, when the group 301A of optical fiber ends and the group 301B of optical fiber ends are seen in the main scan direction, the distance between the ends 71A, 71B of the optical fibers, i.e., the distance between scan lines K, is 10.58 μm (resolution 2400 dpi). The ends 71AT of the optical fibers in the group 301A of the optical fiber ends are followed by the ends 71BT of the optical fibers in the group 301B of the optical fiber ends (see also FIG. 3). Note that FIG. 5 shows the ends 71A, 71B of optical fibers in a smaller number than is actually the case for clarity.

Now, the direction changer 33, a feature of the invention, will be described.

Figure 8:
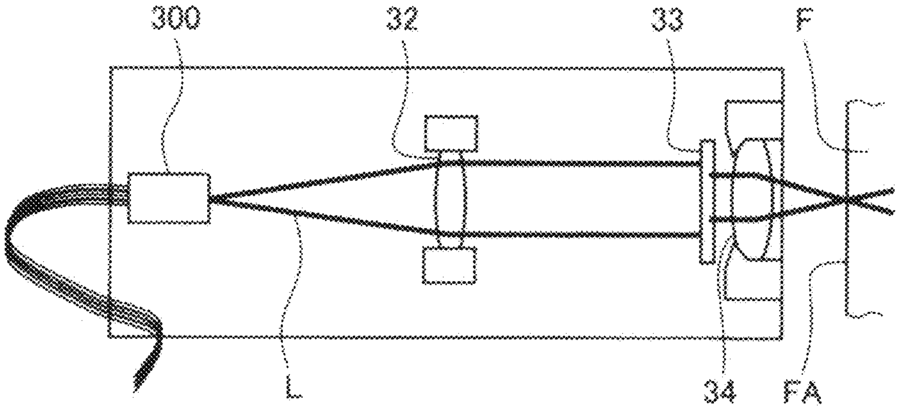
FIG. 8 is a schematic view illustrating the arrangement of a direction changer and its relationship with a laser beam.

The direction changer 33 changes the direction of a laser beam having a numerical aperture (referred to as NA below) higher than a given NA to prevent a laser beam having a higher (greater) NA than a given imaging NA (i.e., imaging NA of the exposure lens) or a given imaging angle from affecting the process of engraving an image on the surface of the recording plate F, so that the energy of the laser is smaller than the radiation threshold energy per unit area at which irradiation starts engraving on the recording plate F. As illustrated in FIG. 8, the direction changer 33 according to this embodiment is disposed between the collimating lens 32 and the imaging lens 34 (see also FIG. 1).

The direction changer 33 is not limited in any manner, provided that it is capable of the above function; examples thereof include refraction elements (a plano-concave lens, plano-convex lens, etc.), diffraction elements (a zone plate, a holographic lens, a kinoform lens, a binary optical element, etc.), reflection members (a mirror, etc.), and the like.

Now, a case using a refraction element 33*a* as the direction changer 33 will be described.

Figure 9C:
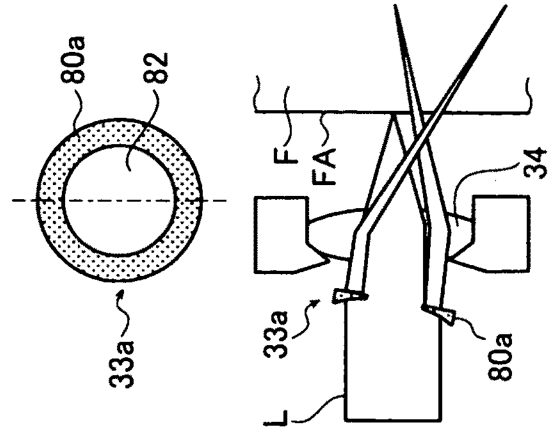
FIGS. 9A to 9C are schematic views each illustrating an optical path followed by a laser beam in a case using a refraction element as direction changer.
Figure 9B:
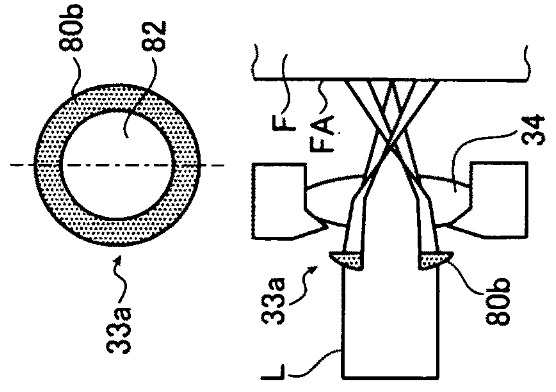
Figure 9A:
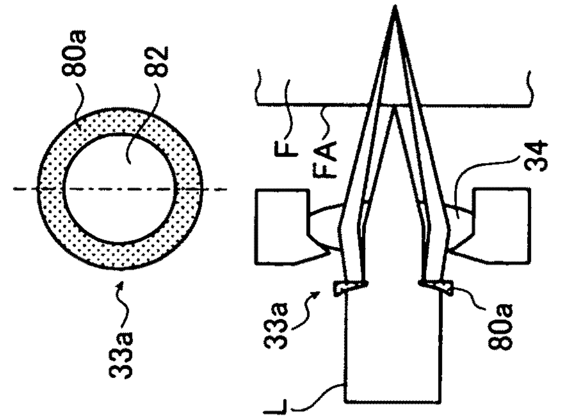

FIGS. 9A to 9C are schematic views each illustrating an optical path followed by a laser beam in a case using a refraction element as a direction changer. FIGS. 9A to 9C illustrate cases where an angle of a laser beam having a NA higher than a given NA is changed: a case where the laser beam converges in the recording plate F, a case where the laser beam converges on the exposure surface FA of the recording plate F, and a case where the laser beam converges at points in the recording plate F, one point apart from the other in a direction orthogonal to a direction in which the laser beam L travels, respectively.

First, the refraction element 33*a* illustrated in FIG. 9A is a doughnut-shaped plano-concave lens (an area where the lens lies) 80*a* obtained by forming a circular aperture (an area where the lens does not exist) 82 having a diameter corresponding to a given NA at the center of a circular plano-concave lens. The refraction element 33*a* is disposed between the collimating lens 32 and the imaging lens 34 so that the concave side of the plano-concave lens 80*a* faces upstream in the direction in which the laser beam L travels.

A laser beam having an NA lower than the given NA passes through the aperture 82 of the refraction element 33*a* to enter the imaging lens 34 and is caused by the imaging lens 34 to form an image close to the exposure surface FA of the recording plate F. A laser beam having an NA higher than the given NA, on the other hand, is refracted by the plano-concave lens 80*a* in directions such that the beam diameter increases and caused by the imaging lens 34 to converge in the recording plate F.

The refraction element 33*a* illustrated in FIG. 9B is a doughnut-shaped plano-convex lens (an area where the lens lies) 80*b* obtained by forming a circular aperture (an area where the lens does not exist) 82 having a diameter corresponding to a given NA at the center of a circular plano-convex lens. The refraction element 33*a* is disposed between the collimating lens 32 and the imaging lens 34 so that the convex side of the plano-convex lens 80*b* faces upstream in the direction in which the laser beam L travels.

The effects produced by a laser beam having an NA less than the given NA are the same as in the case of FIG. 9A. A laser beam having an NA higher than the given NA, on the other hand, is refracted by the plano-convex lens 80*b* in directions such that the beam diameter decreases and caused by the imaging lens 34 to converge on the exposure surface FA of the recording plate F.

The refraction element 33*a* illustrated in FIG. 9C has the same configuration and produces the same effects as the refraction element 33*a* illustrated in FIG. 9A except that the concave side of the plano-concave lens 80*a* is inclined a given angle with respect to the direction in which the laser beam L travels.

The effects produced by a laser beam having an NA less than the given NA are the same as in the case of FIG. 9A. A laser beam having an NA higher than the given NA produces the same effects as in the case of FIG. 9A but is caused by the imaging lens 34 to converge at points in the recording plate F, one point apart from the other in the direction orthogonal to the direction in which the laser beam L travels depending upon the tilt angle of the plano-concave lens 80*a*.

Thus, a laser beam having the NA higher than the given NA may be defocused and its irradiation power reduced on the printing plate by refracting the laser beam with the refraction element 33*a* to change the angle of the laser beam to such an extent that does not affect the engraving. Further, since no aperture member is used, there is no possibility of an aperture member intercepting a laser beam having the NA higher than the given NA, which would generate heat. This and the feeble irradiation power combine to greatly reduce heat generation.

Next, a case using a Fresnel zone plate 33*b* as the direction changer 33 will be described.

Figures 10A, 10B, 10C:
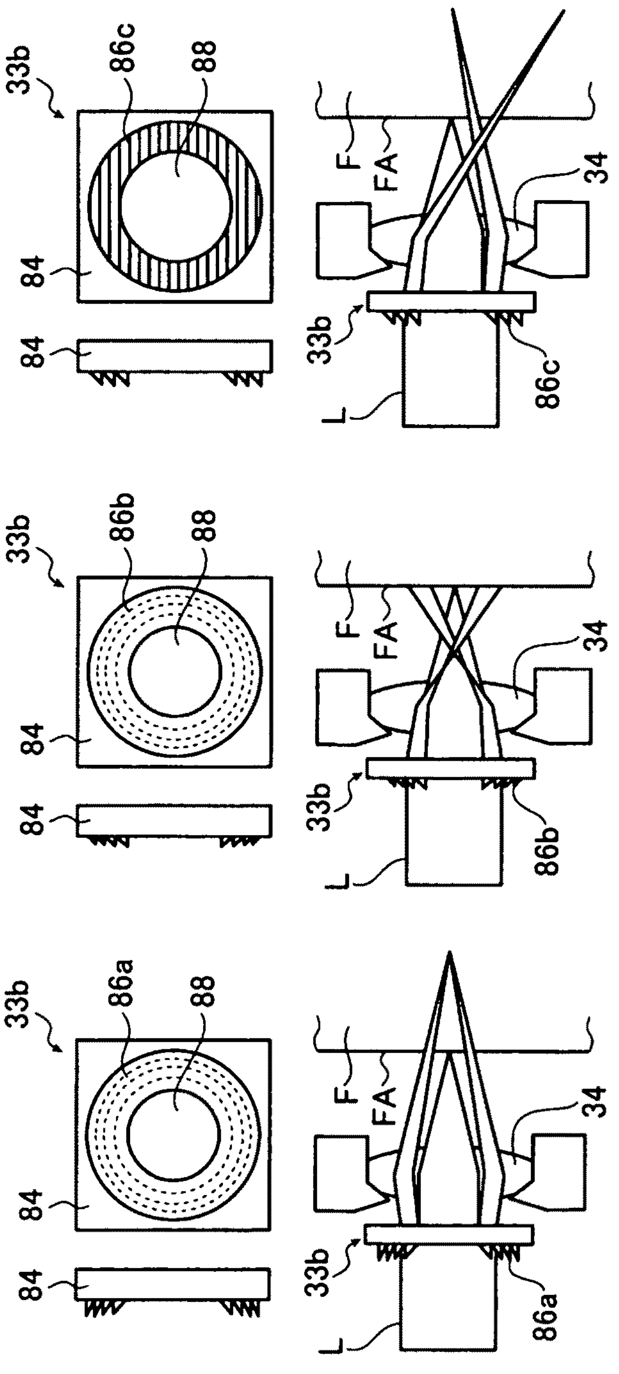
FIGS. 10A to 10C are schematic views each illustrating an optical path followed by a laser beam in a case using a Fresnel zone plate as direction changer.

FIGS. 10A to 10C are schematic views each illustrating an optical path followed by a laser beam in a case using a Fresnel zone plate as a direction changer. As in the case of FIGS. 9A to 9C, FIGS. 10A to 10C illustrate cases where an angle of a laser beam having an NA higher than a given NA is changed: a case where the laser beam converges in the recording plate F, a case where the laser beam converges on the exposure surface FA of the recording plate F, and a case where the laser beam converges at points in the recording plate F, one point apart from the other in a direction orthogonal to a direction in which the laser beam L travels, respectively.

The Fresnel zone plate 33*b* illustrated in FIG. 10A is a doughnut-shaped plano-concave Fresnel lens (an area where the Fresnel zone lies) 86*a* obtained by forming a circular aperture (an area where the Fresnel zone does not exist) 88 having a diameter corresponding to a given NA at the center of a circular plano-concave Fresnel lens (obtained by dividing the concave plane of the plano-concave lens so as to form a Fresnel lens) formed on the base 84. The Fresnel zone plate 33*b* is disposed between the collimating lens 32 and the imaging lens 34 so that the concave side of the concave Fresnel lens 86*a* faces upstream in the direction in which the laser beam L travels.

The Fresnel zone plate 33*b* illustrated in FIG. 10B is a doughnut-shaped plano-convex Fresnel lens (an area where the Fresnel zone lies) 86*b* obtained by forming a circular aperture (an area where the Fresnel zone does not exist) 88 having a diameter corresponding to a given NA at the center of a circular plano-convex Fresnel lens (obtained by dividing the convex plane of the plano-convex lens so as to form a Fresnel lens) formed on the base 84. The Fresnel zone plate 33*b* is disposed between the collimating lens 32 and the imaging lens 34 so that the convex side of the convex Fresnel lens 86*b* faces upstream in the direction in which the laser beam L travels.

The Fresnel zone plate 33*b* illustrated in FIG. 10C is a doughnut-shaped plano-concave line type Fresnel lens (an area where the Fresnel zone lies) 86*c* obtained by forming a circular aperture (an area where the Fresnel zone does not exist) 88 having a diameter corresponding to a given NA at the center of a circular plano-concave line type Fresnel lens (obtained by dividing the concave plane extending in one direction and arranging the divided concave planes so as to extend in parallel) formed on the base 84. The Fresnel zone plate 33*b* is disposed between the collimating lens 32 and the imaging lens 34 so that the concave side of the plano-concave line type Fresnel lens 86*c* faces upstream in the direction in which the laser beam L travels.

The Fresnel zone plate 33*b* illustrated in FIGS. 10A to 10C produces the same effects on the laser beam as the refraction element 33*a* illustrated in FIGS. 9A to 9C, respectively. In other words, both achieve the same function using different means.

Next, a case using a refraction member as the direction changer 33 will be described.

Figure 11:
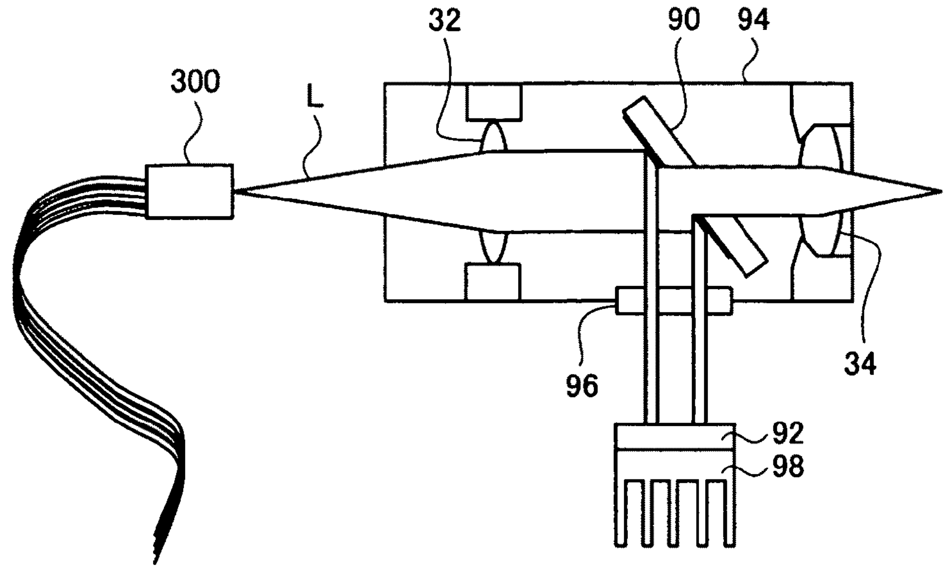
FIG. 11 is a schematic view illustrating an optical path followed by a laser beam in a case using a reflection member as direction changer.
Figure 12:
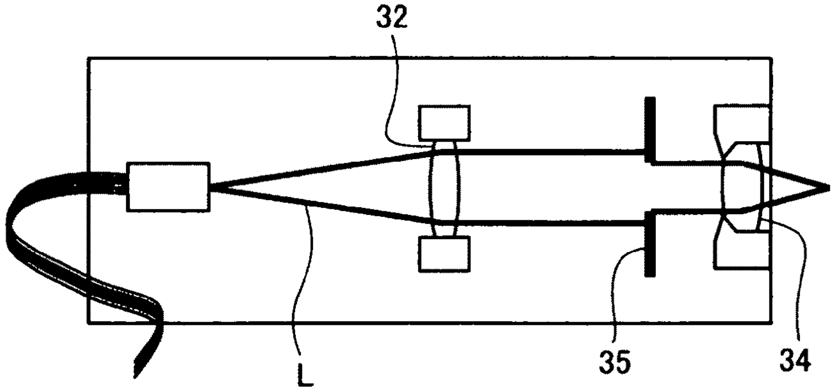
FIG. 12 is a schematic view illustrating a configuration of an exposure system of a conventional exposure device.
Figure 13:
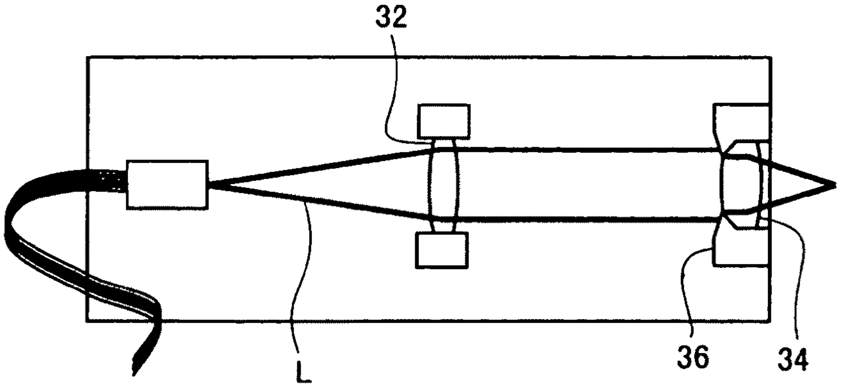
FIG. 13 is a schematic view illustrating a configuration of an exposure system of a conventional exposure device.

FIG. 11 is a schematic view illustrating an optical path followed by a laser beam in a case using a reflection member as a the direction changer. An example illustrated in FIG. 11 comprises as direction changer 33 a partial reflection member (e.g., a mirror) 90 and a light absorption member 92. The partial reflection member passes (e.g., through an aperture) or transmits (e.g., through a glass or a lens) a laser beam having an NA not greater than a given NA and reflects a laser beam having an NA greater than the give NA. The light absorption member 92 absorbs a laser beam reflected by the partial reflection member 90.

The partial reflection member 90 is provided between the collimating lens 32 and the imaging lens 34 inside a lens tube 94 of the exposure lens at an angle of 45° with respect to the optical axis of the lens (the direction in which the laser beam L travels), with the reflection surface directed upstream in the direction in which the laser beam L travels. Thus, the collimating lens 32, the partial reflection member 90, and the imaging lens 34 are disposed in this order inside the lens tube 94. The lens tube 94 has a laser beam emission aperture 96 formed of a flat anti-reflection coated glass formed in the peripheral wall.

The light absorption member 92 is disposed outside the lens tube 94 at right angles to the direction in which the laser beam L reflected by the partial reflection member 90 travels. The light absorption member 92 has on its reverse side heat dissipation fins 98 for cooling the light absorption member 92.

A laser beam having an NA not greater than a given NA is passed or transmitted through the partial reflection member 90 to enter the imaging lens 34, which causes the laser beam to form an image close to the exposure surface FA of the recording plate F. A laser beam having an NA higher than the given NA, on the other hand, is reflected by the partial reflection member 90 at right angles to the direction in which it travels and passed through the flat glass of the laser beam emission aperture 96 formed in the peripheral wall of the lens tube 94 before entering and being absorbed by the light absorption member 92 disposed outside the lens tube 94 and provided with the heat dissipation fins 98.

The above configuration can prevent the laser beam from building up inside the lens tube 94, enable the light absorption member 92 to efficiently absorb heat generated by the laser beam having the NA higher than the given NA, and allow the heat dissipation fins 98 to release the absorbed heat generated by the laser beam.

The configuration of the partial reflection member 90 is not limited in any manner, provided that it can perform the above function. The partial reflection member 90 may be disposed at an angle other than 45°, provided that the heat generation caused by the laser beam having the NA higher than the given NA can be prevented. In this case, the position where the light absorption member 92 is disposed may be varied as appropriate according to the tilt angle of the partial reflection member 90. The partial reflection member 90 may be formed into the form of a lens.

The flat glass of the laser beam emission aperture 96 may be replaced by a lens to converge the laser beam into a spot, reducing the space needed to provide the light absorption member 92. An air curtain may be provided at the laser beam emission aperture 96 to prevent the heat released by the heat dissipation fins 98 from being fed back toward the exposure lens. Further, the flat glass or the lens may be provided with a coating for blocking heat radiation.

Although the case described above releases the heat of the light absorption member 92 using the heat dissipation fins 98, the invention is not limited to that way of heat dissipation. The heat of the light absorption member 92 may be cooled using any cooling means (cooling members) including, for example, water cooling, air cooling, and heat pipes.

The direction changer 33 may be disposed in at least one location on the optical path of the laser beam having the NA higher than the given NA: upstream of the exposure lens in the direction in which the laser beam L travels (according to this embodiment, upstream of the collimating lens 32 in the direction in which the laser beam L travels), downstream of the exposure lens in the direction in which the laser beam L travels (according to this embodiment, downstream of the imaging lens 34 in the direction in which the laser beam L travels), and inside of the exposure lens (according to this embodiment, between the collimating lens 32 and the imaging lens 34).

The exposure lens need not necessarily be limited to the collimating lens 32 and the imaging lens 34; other lenses may also be used where necessary in numbers required.

Next, a control system of the engraving apparatus 11 (see FIG. 1) provided with the exposure device 10 according to this embodiment will be described.

Figure 6:
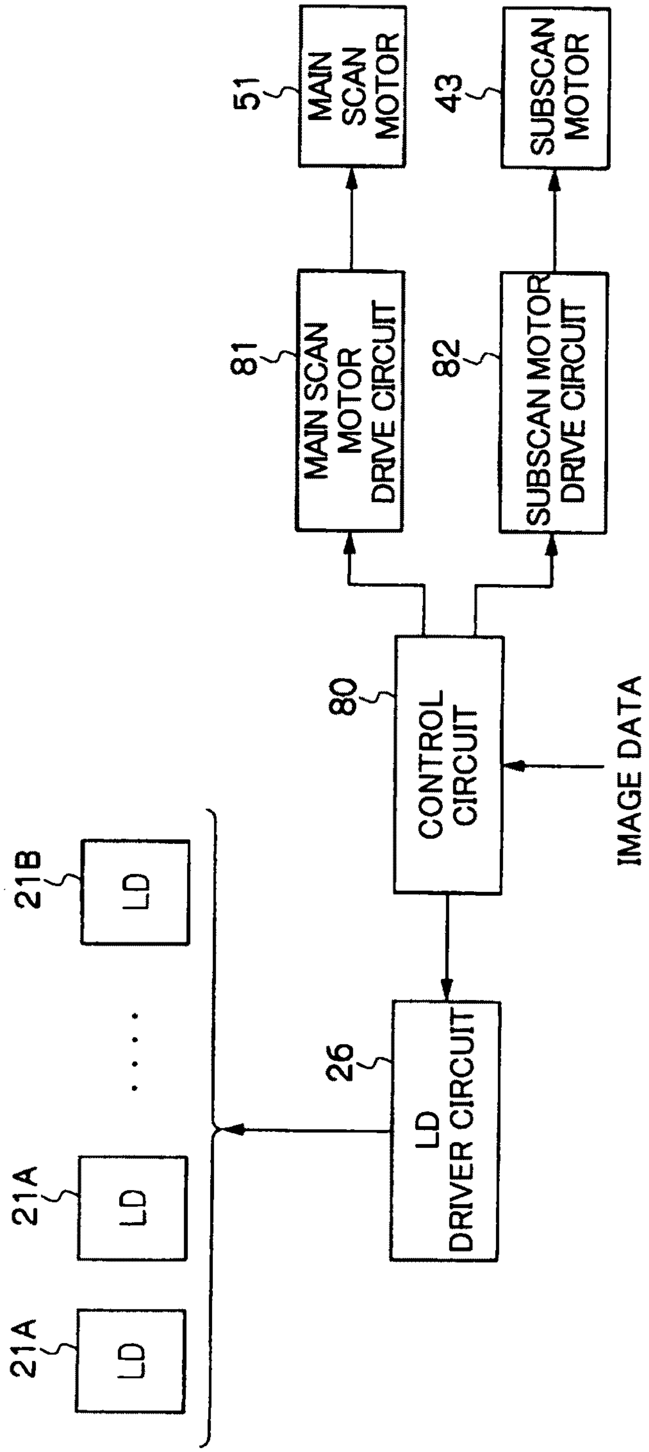
FIG. 6 is a block diagram illustrating a configuration of a control system of the engraving apparatus.

As illustrated in FIG. 6, the control system of the engraving apparatus 11 provided with the exposure device 10 comprises an LD driver circuit 26 for driving the semiconductor lasers 21A, 21B according to image data, a main scan motor drive circuit 81 for driving a main scan motor 51, a subscan motor drive circuit 82 for driving a subscan motor 43, and a control circuit 80 for controlling the main scan motor drive circuit 81 and the subscan motor drive circuit 82. The control circuit 80 is supplied with image data representing an image to be engraved (recorded) on the recording plate F.

Figure 7:
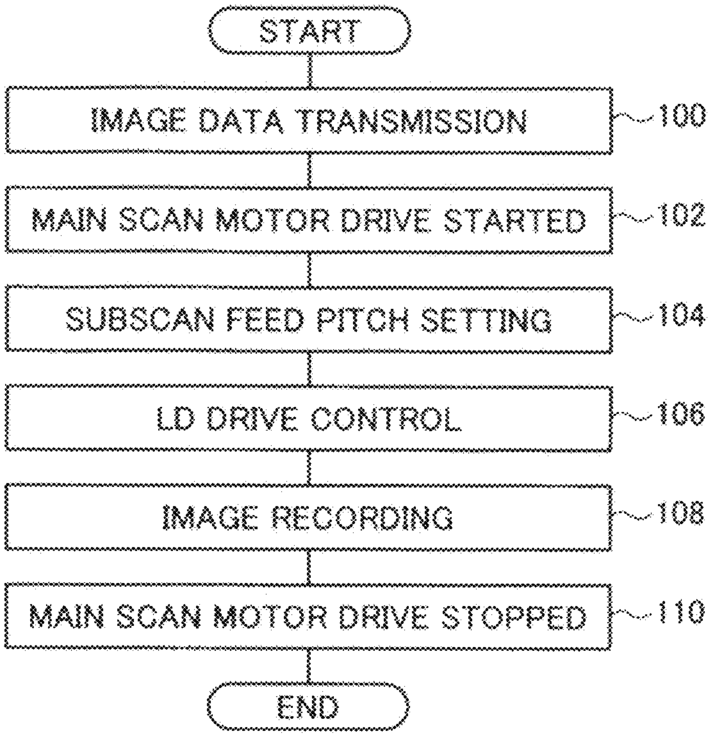
FIG. 7 is a flowchart illustrating a process flow for performing image recording with the exposure device.

Next, a process of engraving (recording) an image on a recording plate F with the thus configured exposure device 10 (see FIG. 1) will be described. FIG. 7 is a flowchart illustrating a processing flow for performing image recording with the exposure device 10.

First, an image memory, not shown, which temporarily stores image data of an image to be engraved (recorded) on the recording plate F, transmits such image data to the control circuit 80 (step 100). The control circuit 80 supplies the LD driver circuit 26, the main scan motor drive circuit 81, and the subscan motor drive circuit 82 with a signal that was adjusted according to the transmitted image data it receives, resolution data that indicates a given resolution of an image to be recorded, etc.

Next, the main scan motor drive circuit 81 controls the main scan motor 51 to turn the drum 50 in the direction indicated by the arrow R in FIG. 1 at a rotation speed corresponding to said resolution data based upon the signal supplied from the control circuit 80 (step 102).

The subscan motor drive circuit 82 sets a feed pitch of the exposure head 30 fed by the subscan motor 43 in the subscan direction according to said resolution data (step 104).

Next, the LD driver circuit 26 controls the drive of the semiconductor lasers 21A, 21B according to the image data (step 106).

The laser beams emitted by the semiconductor lasers 21A, 21B are emitted from the optical fiber ends 71A, 71B of the fiber array unit 300 through the optical fibers 22A, 22B, the SC type optical connectors 25A, 25B, and the optical fibers 70A, 70B, and collimated, as illustrated in FIGS. 1 and 4, into a substantially parallel flux of light by the collimating lens 32, then reduced in amount of light by the direction changer 33 before passing through the imaging lens 34 to form an image (converge) close to the exposure surface FA of the recording plate F on the drum 50.

In this case, beam spots are formed on the recording plate F according to the laser beams LA, LB emitted from the semiconductor lasers 21. The exposure head 30 is fed in the subscan direction at a feed pitch that is set in the step 104 as described above while the drum 50, started in the above-mentioned step 102, turns so that the beam spots engraves (forms) a 2-dimensional image on the recording plate F with a resolution that is determined based upon the resolution data.

When the engraving (recording) of the 2-dimensional image on the recording plate F is accomplished, the main scan motor drive circuit 81 stops driving the main scan motor 51 (step 110), thereafter terminating the processing.

Note that the present invention is not limited to the above embodiment.

For example, the exposure light source is not limited to a semiconductor laser and may be another light source such as, for example, an LED (light emitting diode). Thus, one may use a light beam emitted from any of various light sources as appropriate instead of a laser beam.

The number and arrangement of the optical fiber ends contained in the groups of optical fiber ends are not limited in any manner. Further, the number of groups of the optical fiber ends is not limited to two; one or more than two groups of optical fiber ends may be arranged.

Still further, the light beam is not limited to multiple beams and may be a singular beam, nor is the light source limited to one using optical fibers (FC-LC light source), permitting use of a light source not employing optical fibers.

The present invention is basically as described above.

While described above in detail, the present invention is not limited in any manner to the above embodiments and various improvements and modifications may be made without departing from the spirit of the invention.

What is claimed is:

1. An exposure device for engraving an image on a surface of a recording medium by scanning and exposing the recording medium with a light beam emitted from an exposure head, wherein the exposure head comprises:

a light source that emits a first light beam, an exposure lens for causing the first light beam emitted from the light source to form an image on or close to the surface of the recording medium, and a direction changer disposed in at least one location of upstream of the exposure lens in a travel direction of the first light beam, downstream of the exposure lens in the travel direction of the first light beam and inside of the exposure lens on an optical path of a second light beam forming a part of the first light beam and having a numerical aperture higher than a given numerical aperture to change a travel direction of the second light beam in such a manner as to prevent the second light beam from affecting a process of engraving the image on the surface of the recording medium, wherein the light source is at least one group of optical fiber ends comprising arrayed optical fiber ends each of which emits the first light beam, wherein the exposure lens causes the first light beams emitted from the at least one group of optical fiber ends to form an image on or close to the surface of the recording medium, and wherein the direction changer is one of a refraction element for refracting the second light beam to change the direction of the second light beam, and a diffraction element for diffracting the second light beam to change the direction of the second light beam.

2. The exposure device according to claim 1, wherein the direction changer is the refraction element, and the refraction element is a plano-concave lens disposed so that a concave side thereof faces upstream in the travel direction of the first light beam and having a circular aperture with a diameter corresponding to the given numerical aperture formed at a center of the plano-concave lens.

3. The exposure device according to claim 2, wherein the plano-concave lens is inclined a given angle with respect to the travel direction of the first light beam.

4. The exposure device according to claim 1, wherein the direction changer is the refraction element, and the refraction element is a plano-convex lens disposed so that a convex side thereof faces upstream in the travel direction of the first light beam and having a circular aperture with a diameter corresponding to the given numerical aperture formed at a center of the plano-convex lens.

5. The exposure device according to claim 4, wherein the plano-convex lens is inclined a given angle with respect to the travel direction of the first light beam.

6. The exposure device according to claim 1, wherein the direction changer is the diffraction element, and the diffraction element is one of a zone plate, a holographic lens, a kinoform lens, and a binary optical element.

7. An exposure device for engraving an image on a surface of a recording medium by scanning and exposing the recording medium with a light beam emitted from an exposure head, wherein the exposure head comprises:

a light source that emits a first light beam, an exposure lens for causing the first light beam emitted from the light source to form an image on or close to the surface of the recording medium, and a direction changer disposed in at least one location of upstream of the exposure lens in a travel direction of the first light beam, downstream of the exposure lens in the travel direction of the first light beam and inside of the exposure lens on an optical path of a second light beam forming a part of the first light beam and having a numerical aperture higher than a given numerical aperture to change a travel direction of the second light beam in such a manner as to prevent the second light beam from affecting a process of engraving the image on the surface of the recording medium, wherein the light source is at least one group of optical fiber ends comprising arrayed optical fiber ends each of which emits the first light beam, wherein the exposure lens causes the first light beams emitted from the at least one group of optical fiber ends to form an image on or close to the surface of the recording medium, and wherein the direction changer is a reflection member for reflecting the second light beam by a given angle to change a travel direction of the second light beam, and further comprising a light absorption member for absorbing the second light beam reflected by the reflection member.

8. The exposure device according to claim 7, further comprising a cooling member for cooling the light absorption member.

9. The exposure device according to claim 7, wherein the reflection member is disposed inside a lens tube of the exposure lens and the light absorption member is disposed outside of the lens tube of the exposure lens.

10. The exposure device according to claim 9, wherein a light beam emission aperture is formed in a peripheral wall of the lens tube of the exposure lens for emitting the second light beam reflected by the reflection member so that the second light beam reflected by the reflection member enters the light absorption member through the light beam emission aperture.

11. The exposure device according to claim 10, wherein the light beam emission aperture is formed of a flat glass provided with an anti-reflection coating.

12. The exposure device according to claim 11, wherein the flat glass is provided with a coating for blocking heat radiation.

13. The exposure device according to claim 10, wherein the light beam emission aperture is formed of a lens that converges the second light beam reflected by the reflection member and causes the second light beam reflected by the reflection member to enter the light absorption member.

14. The exposure device according to claim 13, wherein the lens is provided with a coating for blocking heat radiation.

15. The exposure device according to claim 10, wherein the light beam emission aperture is provided with an air curtain.

* * * * *